May 25, 1954 P. G. CARPENTER 2,679,157
VISCOSIMETER
Filed Oct. 3, 1949
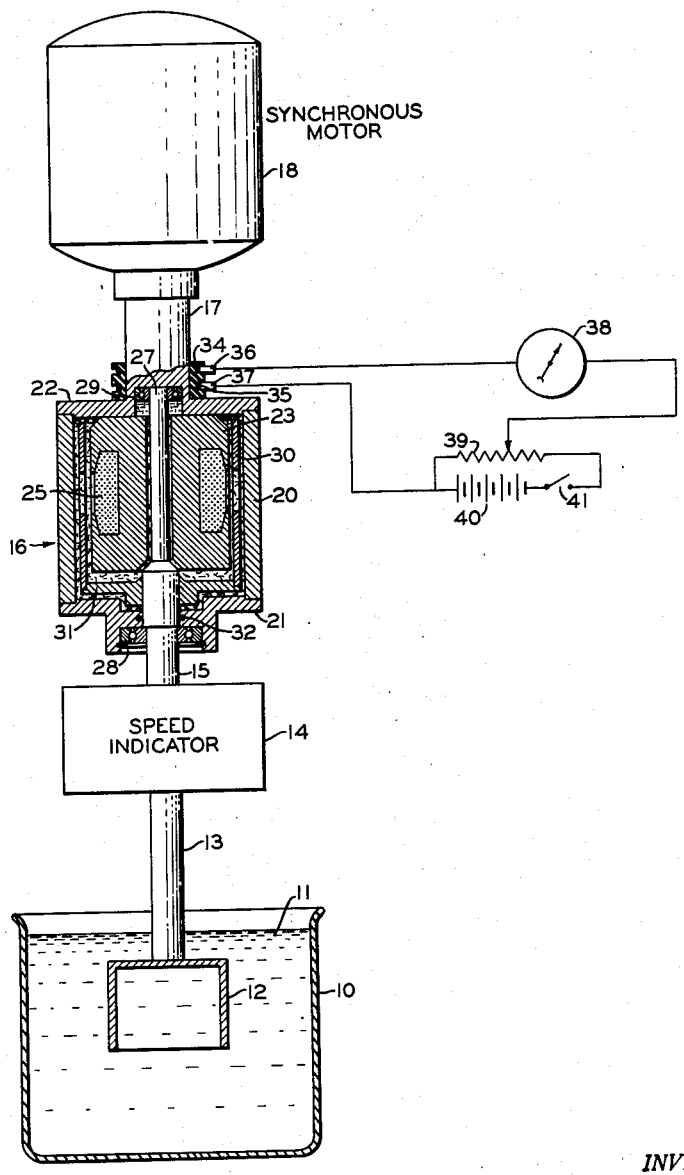
INVENTOR.
P. G. CARPENTER
BY *Hudson & Young*
ATTORNEYS Patented May 25, 1954

2,679,157

UNITED STATES PATENT OFFICE 2,679,157

VISCOSIMETER

Paul G. Carpenter, Bartlesville, Okla., assignor to Phillips Petroleum Company, a corporation of Delaware Application October 3, 1949, Serial No. 119,256

3 Claims. (Cl. 73—59)

This invention relates to apparatus for determining the viscosity of a fluid.

Heretofore, in measuring viscosity, the fluid to be tested has been placed in a vessel and a rotor has been rotated in this fluid by a gear arrangement driven by a string carrying a weight. By the use of a counter which measures the number of revolutions of the rotor and a stop watch, the number of rotations per unit of time is determined. By suitable calculations, the viscosity of the fluid under test may be determined. It is evident that this method of measuring viscosity is rather complicated and requires constant adjustment of the apparatus while the measurement is being taken.

In accordance with this invention, the rotor is driven by a synchronous motor through a power-transferring mechanism which can be adjusted to vary the coupling between the rotor and the synchronous motor. When the motor and rotor are both rotated at predetermined rates, the energy consumed by the power-transferring device is proportional to the viscosity of the liquid or fluid under test.

It is an object of the invention to provide improved apparatus for measuring viscosity.

It is a further object to provide such apparatus in a compact, rugged formed wherein the parts are available at low cost.

Various other objects, advantages, and features of the invention will become apparent from the following detailed description taken in conjunction with the accompanying drawing, in which the figure is a front elevational view, partially in section, of the viscosity measuring apparatus of this invention.

Referring now to the drawing in detail, I have shown a vessel 10 containing a quantity of liquid 11 of the fluid whose viscosity is to be measured. An inverted, cup-shaped rotor 12 is supported by a shaft 13 below the surface of the liquid 11, the shaft 13 being connected through a gear box and speed indicator 14 to a shaft 15 forming a part of a coupling device or power-transferring mechanism 16. This latter device also includes a shaft 17 driven by a synchronous motor 18.

The coupling device 16 includes an outer shell or housing 20 having end caps 21 and 22 suitably secured thereto, together with an annular core 23 secured, as by brazing, to the end cap 22. The shell 20, end caps 21, 22 and core 23 are all formed from a suitable magnetic material and, if desired, they may be of laminated construction. The core 23 carries an annular coil 25 which is disposed within a suitable recess formed at the central outer region of the core.

The shaft 15 has a reduced end portion 27 which is journalled in bearings 28 and 29 mounted in the respective end caps 21 and 22. A cylindrical member 30 of magnetic material is mounted between shell 20 and core 23, this member being carried by an annular base 31 fixed upon the shaft 15. The interior of the housing 20 is filled with small magnetic particles, such as iron powder, suspended in a suitable vehicle, such as lubricating oil or silicone liquids. A gasket 32 is mounted in end cap 21 to seal the region at which shaft 15 enters the housing, thereby to prevent the escape of fluid from the interior of the housing.

The coil 25 is supplied with electrical power by suitable conductors, not shown, which terminate at slip rings 34, 35 fixed to the end cap 22. These slip rings cooperate, respectively, with brushes 36 and 37, which are connected in circuit with an ammeter 38, a variable resistance 39, a battery 40, and a switch 41 in such fashion that the battery 40 supplies a current to the coil which may be regulated by resistance 39, connected in shunt with battery 40, the resulting electrical current supplied to the coil being read upon the meter 38.

The construction of the coupling device 16 is such that the amount of coupling between shafts 15 and 17 is proportional to the current supplied to coil 25 by battery 40. That is, when the current delivered to the coil is of small magnitude, it is relatively easy for the shaft 15 to move relative to the shaft 17 whereas, when the current is increased, it is difficult for the shaft 15 to move relative to shaft 17. Assuming that the motor 18 rotates at constant speed, and the load on shaft 13 is varied but shaft 13 is forced to rotate at a predetermined speed by adjustment of the mechanical coupling by the mechanism 16, it will be evident that a heavy load upon shaft 15 will require a greater amount of power or torque and, hence, a greater consumption of electrical energy by the mechanism 16 in order to maintain shaft 15 at its predetermined speed of rotation. Conversely, a light load on shaft 15 requires that less energy be transferred to the shaft from motor 18 by the mechanism 16 and, hence, a lower consumption of electrical energy by the mechanism 16. Thus, the energy supplied to the coupling device 16, as measured by meter 38, is proportional to the load on shaft 15 when this shaft and motor 18 are both rotated at constant predetermined speeds.

When the shaft 15 is coupled by gear box 14 and shaft 13 to the rotor 12, the load on shaft 15 is proportional to the viscosity of the liquid 11 in container 10 and, hence, the reading of meter 38 is likewise proportional to the viscosity of the liquid. It will be apparent, therefore, that I have attained the objects of my invention in that the viscosity of any liquid may be quickly and accurately determined by rotating motor 18 at a predetermined speed and adjusting variable resistance 39 until shaft 15 also rotates at a predetermined speed of rotation lower than that of motor 18. Thereupon, the reading of meter 38 is proportional to the viscosity of the liquid under test.

It is to be understood that the described coupling device is merely illustrative and that other types of coupling device, either electrical or mechanical, may be used without departing from the spirit and scope of the invention. It is a feature of my invention that the plasticity of the fluid may be determined, in addition to the viscosity. This is accomplished by measuring the viscosity at various speeds of rotation of shaft 15, after which the viscosity is plotted against the speed of rotation of the shaft 15. This curve should be linear for a perfect viscosity characteristic, and departures from linearity are due to the plasticity of the fluid under test.

As will be evident to those skilled in the art, various modifications of this invention can be made, in the light of the foregoing disclosure and discussion, without departing from the spirit or scope of the disclosure or from the scope of the claims.

I claim:

1. Apparatus for measuring viscosity which comprises, in combination, a rotor adapted to be immersed in a fluid whose viscosity is to be measured, a constant speed motor, a coupling mechanism to connect said rotor to said motor, speed indicating means connected to said rotor, said coupling mechanism being adjustable to vary the power transmitted from said motor to said rotor whereby the speed of said rotor can be maintained constant, and means to indicate the power transmitted by said coupling mechanism as a function of the viscosity of said fluid.

2. The combination in accordance with claim 1 wherein said rotor is a member of inverted cup-shaped configuration.

3. Apparatus for measuring viscosity which comprises, in combination, a rotor adapted to be immersed in a fluid whose viscosity is to be measured, a synchronous motor, a pair of spaced relatively rotatable members connected, respectively, to said motor and said rotor, a liquid vehicle in the region between said members, said vehicle having magnetic particles dispersed therein, a coil carried by one of said members, a source of electrical current connected to said coil, speed indicating means connected to said rotor, means to vary the current supplied to said coil to vary the power transmitted from said motor to said rotor whereby the speed of said rotor can be maintained constant, and means to indicate the current supplied to said coil as a function of the viscosity of said fluid.

References Cited in the file of this patent

UNITED STATES PATENTS

| Number | Name | Date |
|---|---|---|
| 2,089,604 | Hagy | Aug. 10, 1937 |
| 2,305,531 | Hurndall | Dec. 15, 1942 |
| 2,330,991 | Newton | Oct. 5, 1943 |
| 2,354,923 | McNamee | Aug. 1, 1944 |
| 2,365,339 | Green | Dec. 19, 1944 |
| 2,410,385 | Loukomsky et al. | Oct. 29, 1946 |
| 2,484,761 | Stock | Oct. 11, 1949 |

OTHER REFERENCES

National Bureau of Standards, Technical Report 1213, April 2, 1948.